Figure 1:
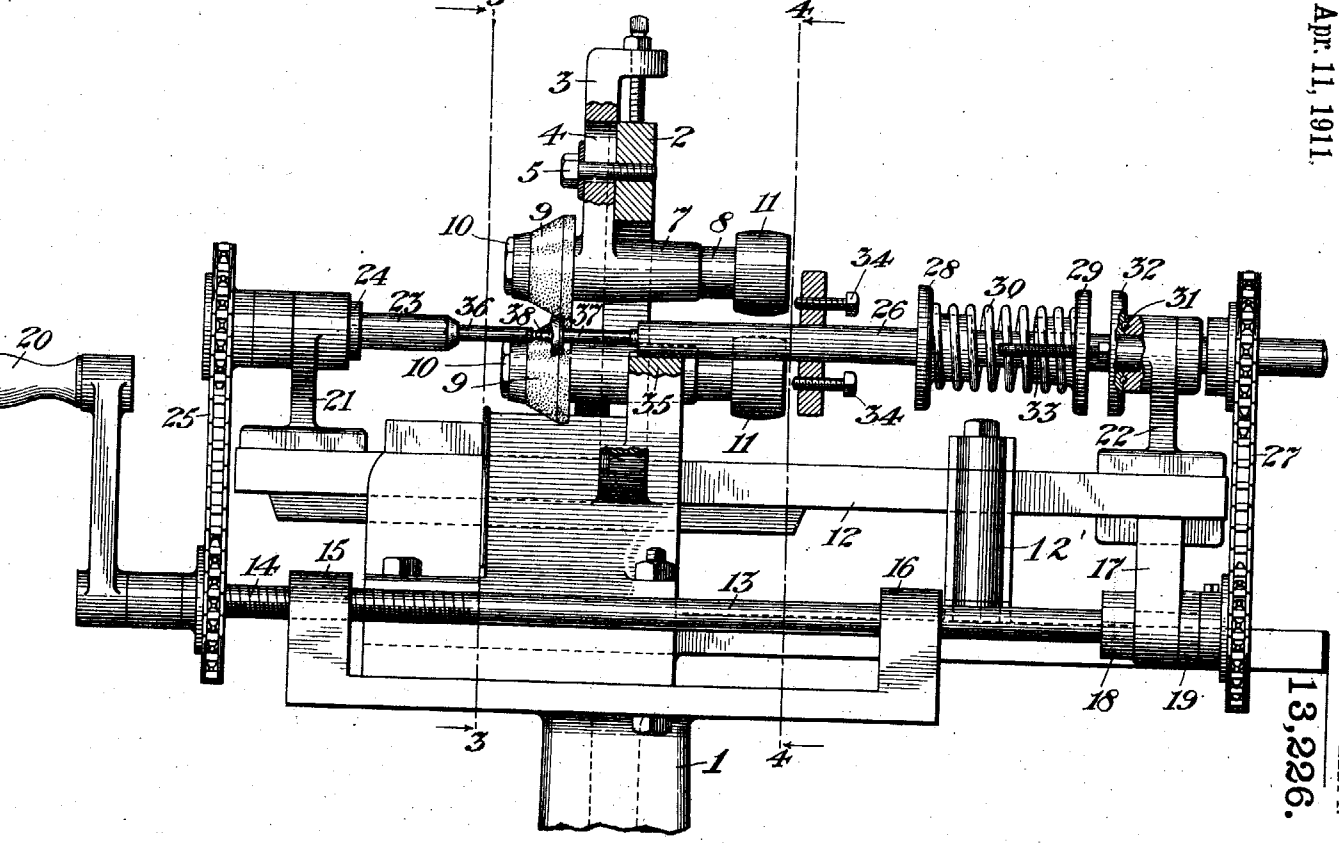

W. J. GOING.

MACHINE FOR SHAPING BLANKS.

APPLICATION FILED MAR. 9, 1911.

3 SHEETS—SHEET 1.

Reissued Apr. 11, 1911.

13,226.

Witnesses
Chas. F. Clagett
Arthur S. Trevis

W. J. Going Inventor
By his Attorneys
Warfield & Duell

THE NORRIS PETERS CO., WASHINGTON, D. C.

W. J. GOING.

MACHINE FOR SHAPING BLANKS.

APPLICATION FILED MAR. 9, 1911. 3 SHEETS—SHEET 2.

Reissued Apr. 11, 1911. 13,226.

Witnesses
Chas. F. Clagett
Arthur G. Prevrin

W. J. Going Inventor
By his Attorneys
Warfield & Duell

THE NORRIS PETERS CO., WASHINGTON, D. C.

W. J. GOING.

MACHINE FOR SHAPING BLANKS.

Reissued Apr. 11, 1911.

APPLICATION FILED MAR. 9, 1911.

3 SHEETS—SHEET 3.

13,226.

Witnesses
Chas. F. Clagett
Arthur G. Previn

W. J. Going Inventor
By his Attorneys
Warfield & Duell

THE NORRIS PETERS CO., WASHINGTON, D. C.

UNITED STATES PATENT OFFICE.

WILLIAM JOSEPH GOING, OF AMSTERDAM, NEW YORK, ASSIGNOR TO THE GOING MANUFACTURING COMPANY, OF AMSTERDAM, NEW YORK, A CORPORATION OF NEW YORK.

MACHINE FOR SHAPING BLANKS.

13,226. Specification of Reissued Letters Patent. Reissued Apr. 11, 1911.

Original No. 983,436, dated February 7, 1911, Serial No. 293,877. Application for reissue filed March 9, 1911. Serial No. 613,442.

*To all whom it may concern:*

Be it known that I, WILLIAM JOSEPH GOING, residing at Amsterdam, in the county of Montgomery and State of New York, have invented certain new and useful Improvements in Machines for Shaping Blanks, of which the following is a full, clear, and exact description, such as will enable others skilled in the art to which it appertains to make and use the same.

This invention broadly relates to machines for shaping blanks for various purposes, but as it more particularly concerns improvements in button making machines, it will be conducive to clearness to disclose an embodiment thereof in such connection.

In manufacturing buttons, especially of mother-of-pearl and other nacreous productions of shell fish, it has heretofore been customary to perforate a shell by means of a tubular drill, thereby obtaining a core or blank having the sought for shape of a cylinder. In practice, this operation is attended with many difficulties, prominent among which may be noticed the necessity for frequently resharpening the tool, which ordinarily is of steel or other cutting material, on account of the fact that, although the shell material is comparatively friable, it is peculiarly destructive to a cutting edge and itself acts as a very effective abrasive to high speed tools. Consequently the tools have a short life and have to be continually replenished. Another disadvantage attending prior operations of this nature resides in the fact that it is advisable to continuously apply a suitable lubricant to the cutting surfaces, but such application is not easily made because of the inconvenient location in the work of the cutting edge. Furthermore, it has heretofore been necessary to provide a large stock of cutting tools of diverse sizes in order that blanks of different proportions may be readily made, and this involves a great expense. Broken and worn tools are not readily replaced as they have to be made especially for the purpose and, accordingly, much valuable time is lost whenever such an accident occurs. Another serious difficulty that has been encountered in prior machines resides in the frequency with which otherwise perfect blanks chip and flake at the edges under the action of the machine.

It may here be stated that when blanks are to be cut from shells, it is highly desirable to have the natural polished or smooth face of the shells correspond with the polished face of the button thereafter formed from such blank. In this manner, a great saving in material and blanks may be effected, since such polished face is more nearly finished in the first instance, being free from the serrations found on the rough face, and accordingly it is not necessary to grind away such face to the same extent as would be requisite on the other side. Moreover, it will be recalled that, while it is absolutely essential that the outer face of a pearl button shall have a high finish and be absolutely free from all imperfections whatsoever, it does not make so great a difference in this respect as regards the rear face. Slight imperfections or blemishes on the latter are naturally concealed from view in use and would be unnoticed. Therefore, the desirability of keeping the smooth side to the front will be clear. However, as buttons are in the form of a right cylinder, it is necessary to so grind off the front face that the same will be substantially normal to the circumscribing edge of the button and therefore, the closer that this condition is preliminarily realized in the blank itself, the lesser amount of labor and expense in finishing will be required.

To this end, this invention has in objective a machine particularly adapted to cut button blanks from fragments of shell along a surface which approximates as closely as possible to a perpendicular to the natural polished face of the fragment.

Another object which this invention seeks to realize is a self-adjusting vise or clamping means whereby fragments or blanks will be automatically positioned so that the cutting tools of the machine will always cut away along a surface substantially normal to said polished face.

This invention has in view, among other objects, the production of a machine of the class stated, by the use of which blanks having an irregular contour may be quickly reduced to desired proportions with a minimum of such losses as may be due to chipping or the like, and it especially seeks to provide a grinding machine adapted to operate upon fragments of shell and obtain therefrom cylindrical blanks of any desired diameter.

Still another object lying within the contemplation of this invention is the provision of a machine in which blanks of diverse sizes may be readily made by merely making certain adjustments to which the machine is susceptible.

Another object of the invention is to realize a blank-cutting machine, of as far as possible wholly automatic action, which is capable of effectively subjecting blanks to the influence of certain cutting or abrasive means and, at the conclusion of the cutting operation upon said blanks, automatically discharging the latter and assuming a position for continuously repeating work along this cycle.

Another object accruing to the invention lies in the provision of a cutting means which is not only inexpensive but is adapted to give long service in this class of work. The invention also has regard for certain features of actuation whereby a relative movement between the blank and the cutting edges is had of such a character that the highest efficiency of the machine will be attained.

Another object is to devise a mechanism of the class specified which, from a mechanical standpoint, will, in usage, possess a high degree of efficiency and effectiveness and which structurally considered will be of the greatest possible simplicity, being composed of but few parts, all adapted for being made at a minimum of cost and individually so formed as to be capable of being readily assembled into a neat and compact arrangement for economically accomplishing the purposes intended.

Other objects and advantages will be in part obvious and in part pointed out hereinafter.

With these and other ends in view, this invention accordingly consists in the features of construction, combinations of parts, and arrangement of elements hereinafter more explicitly set forth as an exemplification of the underlying principles involved in the invention.

In order that this invention may be more fully understood and made comprehensible to others skilled in its relating arts, drawings illustrating such embodiment of the same are appended as a part of this specification, and while the controlling principles of the invention may be otherwise applied by modifications falling within the scope of the claims, the herein disclosed form is that which I ordinarily prefer to employ in practice and regard as a substantial improvement over the many implied and obvious variations of the same.

In such drawings, it will be observed that like numerals denote corresponding parts throughout all the figures, of which—

Figure 2:
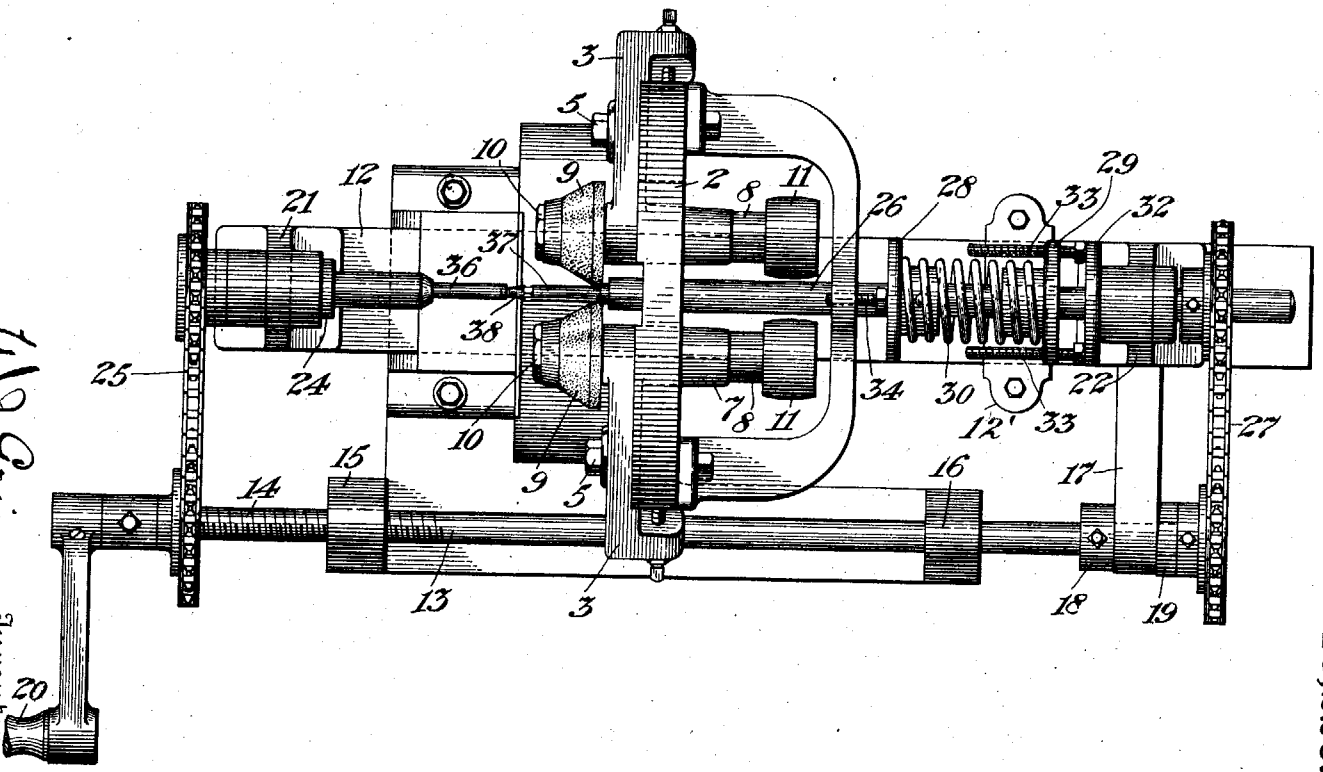
Figure 4:
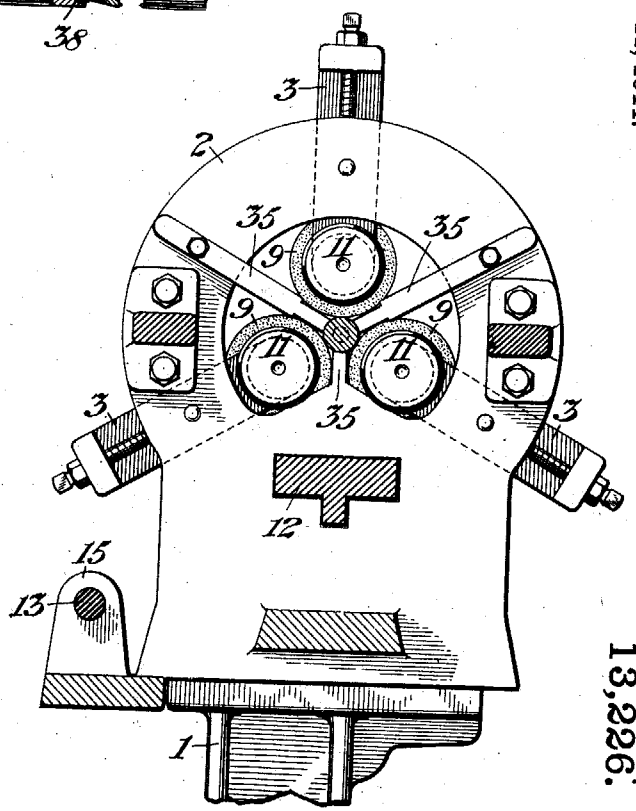
Figure 5:
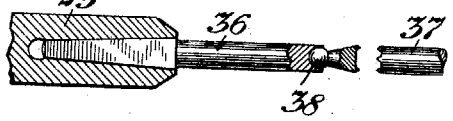
Figure 3:
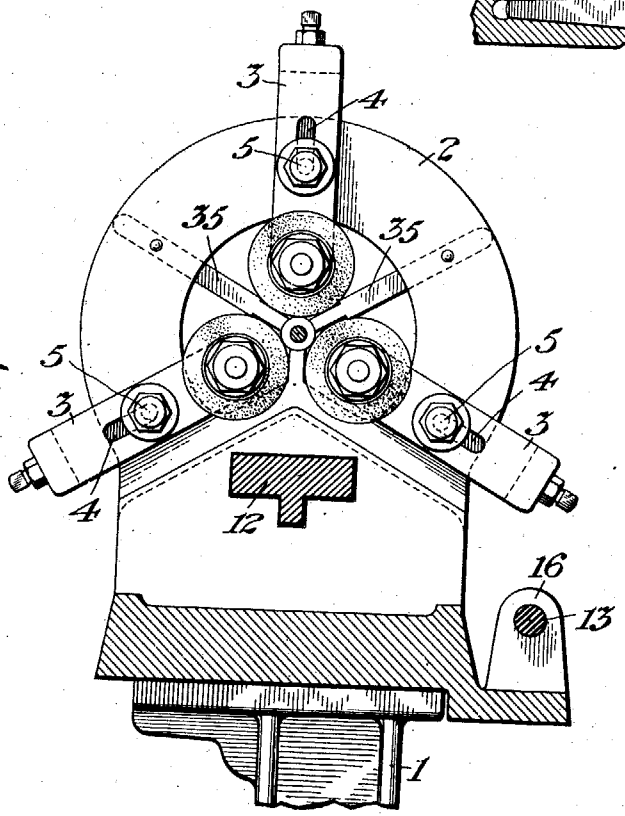

Figure 1 is a side elevation showing the general arrangement of the embodiment selected for illustrative purposes, parts being broken away to more clearly set forth certain details which have been found desirable to incorporate into the device. In this figure the blank is shown as clamped by the reciprocatory vise and positioned so as to be cut away and properly shaped by the abrasive means. Fig. 2 is a top or plan view of the embodiment shown by Fig. 1 but illustrating the reciprocatory vise in an open position and having its clamping jaws away from the abrasive means in position preparatory to the insertion of a blank to be subsequently shaped. In this figure, the uppermost abrasive wheel and adjustable arm have been removed to more clearly show the position of the underlying parts. Fig. 3 is an end view taken in section along line 3—3 of Fig. 1, looking in the direction of the indicating arrow and showing a blank in its finished shape. Fig. 4 is an end view taken in section along line 4—4 of Fig. 1 and looking in the direction of the indicating arrow, illustrating certain details of the means for steadying the reciprocatory vise against vibration. Fig. 5 is a detail showing the arrangement of the self-adjusting jaws as embodied in this invention.

The preferred manner of carrying out this invention may now be understood more explicitly by referring to the foregoing views by means of the reference numerals, of which—

1 denotes the main frame work or standard upon which the operative devices of the invention are mounted. Such standard rises into an annular portion 2, upon which are mounted the abrasive means employed in shaping the fragments of shell. This is shown more clearly by Figs. 3 and 4, in which a series of radially extending arms 3 are shown as carried by the aforesaid portion of the main standard. These arms may be made adjustable in any desired manner, though that shown will be found to be very convenient in practice and merely consists in providing arms with lengthwise extending slots 4 through which a bolt 5 engages with the standard shown to securely fix in place the side arms. To facilitate the adjustment of the positioning of these arms and adapt them to be moved with a considerable degree of nicety, the outer ends of these arms may be turned over and provided with an adjustable end, which is adapted to contact with the periphery of the standard, as shown by Fig. 4, and thereby positively control the positioning of the side arms. It will be perceived that through this instrumentality the abrasive wheels, which are carried at the inner ends of the arms, may be positioned with a high degree of precision so as to secure the best effect in their cutting action.

The abrasive means employed in this machine might be otherwise arranged and constructed than as shown in the drawings, but as for ordinary purposes such shown arrangement is regarded as the preferable one, it will be described as a part of the present embodiment of this invention. To this end, a conical abrasive wheel of emery, carborundum, or like substance, will be revolubly mounted upon the inner extremity of each of the aforesaid adjustable arms. To afford a suitable bearing for this purpose, these arms are provided with an elongated sleeve 7 within which shaft 8 is revolubly journaled. At its outer end such shaft is arranged for removably carrying the abrasive wheels 9, the latter being secured in place against a suitable shoulder forming a part of the shaft as in ordinary constructions by means of an end nut 10. In case the wheel should be found to be unduly worn or fractured, it may be readily replaced by removing the end nut, as will be clearly understood. Preferably, wheels 9 are adapted to be continuously revolved, and to afford a convenient means for doing this, the shaft 8 is provided at its inner extremity with a pulley 11 over which takes a belt driven from a suitable source of power. It may be observed in this connection that it is not necessary to have the aforesaid wheels be all of even size, as they may conveniently be of diverse proportions and be adapted to be adjusted so as to act simultaneously upon a blank passing therebetween.

The vise which carries the blank into contact with the abrasive wheels may now be explained. This feature of the invention is preferably automatic and it preferably carries the blank forward and simultaneously revolves the same, in order that all portions of the periphery of the blank may equally be contacted with the abrasive wheels in turn. Such vise consists broadly of a reciprocatory carriage 12 which is mounted in the main standard of the machine so as to freely slide back and forth with respect thereto. The frame is preferably provided intermediate its length with an upwardly extending lug 12′ for assisting in supporting the reciprocatory carriage 12. Such carriage is positively actuated in its movements by means of a revoluble shaft 13, which is screw-threaded at 14 and at such point is in threaded engagement with a stud 15 forming a part of the standard 1. A similar stud 16 rises from the standard so as to engage the shaft at a suitable distance from the aforesaid stud, thereby affording a more secure bearing for the shaft. At the inner end such shaft is revolubly collared to an extension 17 from the overlying carriage, and is prevented from moving longitudinally with respect to said extension by means of the collars 18 and 19 but adapted to revolve freely within said extension 17. It will be obvious from this arrangement that a translation of the revoluble shaft 13 will provide a similar motion with regard to the overlying carriage 12, and it will, furthermore, be observed that such translation will result from a screw-threaded engagement at 15, as first mentioned. Accordingly, a revolution of said shaft 13, as, for example, by means of a suitable handle 20, will, according to the direction of rotation of such handle, move carriage 12 backward or forward in the main standard of the machine. The object of this motion will now be more specifically stated.

Rising at the extremities of the reciprocating carriage are journal bearings 21 and 22 respectively, and journaled within the former is an elongated, cylindrical jaw 23. Such jaw is suitably collared as at 24 so as to prevent any translation whatever thereof, but a sprocket chain and gear 25 extends from the outermost end of said revoluble jaw into engagement with the aforesaid revoluble shaft 13, whereby a turning of the one will produce a corresponding turning in the other. Within the other journal bearing 22 is mounted a corresponding jaw 26 revolubly actuated through the sprocket means 27, which is, like the aforesaid sprocket 25, in engagement with the revoluble shaft 13 so as to produce equal rotations in jaws 23 and 26. It is to be noted, however, that jaw 26 is adapted to have a slight movement of translation in addition to its movement of revolution, with respect to the journal bearing 22, this provision being made in order that the jaws may be spread to an extent sufficient to accommodate blanks of diverse thicknesses. An important feature of this invention, however, surrounds the means for normally maintaining the retractile jaw 26 in the position near its companion jaw, and to provide for this a collar 28 is securely affixed to such retractile jaw. The companion collar 29 is loose, however, upon such jaw and said collars are normally spread apart by means of an interposed expansile spring 30, which has a suitable end seating upon each of these collars. Revolubly mounted upon the said retractile jaw and provided with a roller bearing, or other anti-friction bearing, 31 is a collar 32 which rides in contact with the journal bearing 22. To provide for adjustably tensioning spring 30, an adjustable bolt 33 is in screw-threaded engagement with collar 29 so as to abut at its end with collar 32 and spread them apart. From this constructional explanation, it will be understood that jaw 26 may be retracted against the tension of spring 30 until opposite features abut, as, for example, collar 28 abuts the outer end of screw-threaded bolt 33. It will also be clear that any predetermined degree of limit to this motion may be readily assigned to the structure, as this requires mere adaptations which may be easily made by any person skilled in the art.

Upon the main standard of the machine is mounted one or more adjustable stops 34, which are designed to abut the fixed collar 28 and limit the retreat play toward the abrasive means of said jaw 26. The effect of contact between the stops 34 and collar 28 is to compress spring 30, thereby movably giving jaw 26 a translation in its journal. As the jaws 23 and 26 have a considerable length and are under a grinding action which tends to set up excessive vibration therein, it is preferable to provide a series of steadying supports 35, shown more clearly by Figs. 3 and 4. These supports may be radially adjustable so as to take up any wear which may occur in service.

The ends of the revoluble jaws are provided with a conical recess which is adapted to receive end pieces constituting minor jaws, as shown by 36 and 37. This arrangement is preferable, as by means of having the small minor jaws of diverse diameters, it is possible to readily adapt the machine to operate upon various sizes of blanks. An important feature of this invention consists in the peculiar mode of clamping blanks, such as fragments of shell, in place preparatory to subjecting them to the action of the abrasive means. To this end, the jaw 37 has its end face square with its cylindrical contour, so that any flat object pressed thereagainst will assume a position lying in a vertical plane. The companion jaw, however, is swiveled adjacent its end, as shown by 38, and the end itself is provided with a friction surface adapted to take against the face of an inserted blank. While within the contemplation of this invention various forms of friction means may be resorted to, nevertheless, it is preferable for ordinary work to give the ends of the jaws a tripod-like form, the prongs of which are suitably sharpened. Such prongs are adapted to prick into a blank and firmly hold the same against slipping, while at the same time, the tripod shape is one well adapted to lend itself to slight irregularities which will occur upon blanks of the nature ordinarily operated upon by these machines.

The operation of the machine may now be briefly considered. The starting point in the cycle may be taken as indicated by Fig. 2, in which the carriage is substantially at the limit of its retreat, such expression being designed to define the movement away from the abrasive means of the blank, and in such position the jaws are spread apart by means of contact between the stop 34 and the collar 28. A blank may now be readily inserted between such jaws and upon rotating handle 20, the carriage will advance, and in such movement the jaws will begin to close upon the blank until the same is securely held, whereupon collar 28 will leave its contact with the stop 34. In this connection, it is to be observed that, when working upon fragments of shell in the production of buttons of mother-of-pearl, such fragments will be inserted in the jaws with their natural polished surface facing the abrasive means and, as will be clear, such surface will lie as nearly parallel to the plane of rotation of the abrasive wheels as the irregularities of such surface will permit. It is quite immaterial as to the roughness or irregularities of the outer surface, since the swiveled jaw will automatically accommodate itself to any ordinary surface. Continuing now the rotation of handle 20, it will be observed that the carriage will be progressively advanced, the jaws moving at the same time, and also revolving so as to impart such movement to the blank which will soon contact with the abrasive wheels 9. Since such wheels are of conical shape, the periphery of the blank will be gradually reduced until finally the limit will be reached, when the cylindrical faces of the wheels are reached, when the blank will be finished off. It will be noted that this action takes place so as to produce a finished blank in which the cylindrical contour is as nearly normal to the natural face of the blank as possible and, accordingly, the blank may further be finished with a minimum of waste.

It will thus be seen that the invention as herein disclosed is one well adapted to attain the ends and objects pointed out. The grinding machine is capable of being readily made at a small cost and is one which will, in service, possess a high degree of durability and efficiency, and particularly one in which the utmost reliability of action will be had. In carrying out this invention, some parts might be employed without others and new features thereof may be combined with elements to the art in other ways, although the herein described type is regarded as embodying substantial improvements over such changes. Furthermore, the same parts may be employed to carry out modified functions.

Thus by causing the jaws to advance without simultaneously rotating, a blank may be carried against the abrasive wheels so as to impart to such blank a polygonal contour which may be varied throughout a wide range of diverse shapes. To this end the abrasive wheels may be adjustably mounted in different planes so that each wheel may be independently distanced from the center line of the jaws.

A further advantage obtained by this invention lies in the fact that by its use a great saving in shell material is effected, inasmuch as the machine is adapted to operate upon fragments of shells and is not dependent upon complete shells as is the case with some prior apparatus. Thus the present invention is well adapted for use upon the wasted product of core-drill machines as such product consists of perforate shells which may be readily broken up into smaller fragments such as are fitted for being contoured by this invention.

As many changes could be made in the above construction and many apparently widely different embodiments of this invention could be made without departing from the scope thereof, it is intended that all matter contained in the above description or shown in the accompanying drawings shall be interperted in an illustrative and not in a limiting sense. It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:—

1. In mechanism of the class described, in combination, a pair of opposed members adapted to engage opposite faces of a piece of shell leaving the edges thereof exposed, resilient means for holding said members in such engagement, a revoluble abrasive member having a portion of its periphery inclined toward its axis of revolution, and means for moving said opposed members along a line parallel to the axis of revolution of said abrasive member to carry the shell into contact with the inclined portion of said abrasive member.

2. In mechanism of the class described, in combination, means adapted to support a piece of shell leaving the edges thereof exposed, a revoluble abrasive member having a portion of its surface disposed obliquely to its axis of revolution and a portion thereof disposed parallel to said axis, means adapted to move said supporting means to carry the piece of shell into contact with the oblique face of said abrasive member first and subsequently with the portion thereof disposed parallel to the direction of advance of the piece of shell, and means to prevent lateral movement of said supporting means.

3. In mechanism of the class described, in combination, a pair of opposed members adapted to engage opposite sides of a piece of shell leaving the edges thereof exposed, a rotatively mounted abrasive member having a portion of its surface disposed obliquely to its axis of revolution and having another portion disposed parallel to said axis, and means for advancing said opposed members along a line parallel to the axis of the abrasive member to carry the piece of shell into contact with said abrasive member.

4. In mechanism of the class described, in combination, a blank carrying means comprising independently mounted jaws one of which is spring pressed toward the other, means for revolving said jaws, means for reciprocating said jaws along a line parallel to the axis of revolution, and means adapted to separate said jaws during one of the reciprocal movements thereof.

5. In mechanism of the class described, in combination, a blank carrying means comprising a pair of alined jaws one of which is spring pressed toward the other, means for revolving said jaws, means for reciprocating said jaws along a line parallel to the axis of revolution, and means adapted to separate said jaws during one of the reciprocal movements thereof.

6. In mechanism of the class described, in combination, a vise adapted to clamp a blank, said vise comprising a pair of independent jaws, one of which is adapted to be reciprocated with respect to the other, a spring normally pressing said jaws together, means for rotating said vise, means for advancing said vise along a line parallel with its axis of revolution, and an adjustable stop adapted to abut said spring and separate said jaws during one of the reciprocal movements of the vise.

7. In a device of the class described, in combination, rotatable abrasive means, and a vise comprising a pair of jaws adapted to be moved in a direction parallel with the axis of rotation of said abrasive means, whereby the jaws will be brought into proximity to said abrasive means, the more distant of said jaws being swiveled.

8. In a device of the class described, in combination, rotatable abrasive means, and a vise comprising a pair of jaws adapted to be moved in a direction parallel with the axis of rotation of said abrasive means whereby said jaws will be brought in proximity to said abrasive means, the more distant of said jaws being swiveled and one of said jaws being provided with a plurality of prongs.

9. In a device of the class described, in combination, a rotatable abrasive wheel, a vise having a pair of jaws one of which is swiveled and the other thereof rigid, said jaws being provided on their opposing faces with a numebr of prongs, jaw-steadying supports positioned adjacent said wheel, and means for rotating said jaws and simultaneously advancing said vise toward said wheel in a direction parallel to the axis of rotation thereof.

10. In a device of the class described, in combination, an abrasive means, a vise for holding a blank and adapted to be translated to carry the blank into engagement with said abrasive means, said vise having a plurality of jaws, of which one is swiveled adjacent one of its ends and having its other end provided with a number of prongs, and another of which is rigid, means for rotating said jaws, and a means adjacent said abrasive means for steadying said jaws and preventing vibration thereof.

11. In a device of the class described, in combination, an abrasive means, a vise for holding a blank and adapted to be moved to carry the blank into engagement with said abrasive means, said vise being provided with a pair of jaws of which that more distant from said abrasive means is swiveled, and a support adjacent said abrasive means adapted to engage and steady the other jaw.

12. In a device of the class described, in combination, an abrasive means, a reciprocatory vise for holding a blank and adapted to be advanced to carry the blank into engagement with said means, said vise having two jaws, of which one is swiveled and is provided on its clamping face with two or more prongs, said jaw being the more distant from said abrasive means, means for rotating said jaws and a steadying support adjacent said abrasive means and engaging said other jaw.

13. In a device of the class described, in combination, a plurality of abrasive wheels revolubly journaled to a stationary member with their peripheries equidistantly disposed from a center line, a pair of elongated clamping-jaws adapted to grip a blank within the periphery thereof whereby a circumscribing portion protrudes, a means adjacent said wheels for steadying said jaws, and a means serving to revolubly advance said jaws and the blank carried thereby along said center line whereby said circumscribing portion will be removed by contact with said abrasive wheels.

14. In a device of the class described, in combination, a plurality of abrasive wheels symmetrically disposed upon and carried by a stationary member, means for effecting an adjustment and positioning of said wheels within their common plane of rotation, a vise consisting of elongated, spring-pressed jaws adapted to clamp a blank within its periphery and rotatably advance the same whereby such protruding portions will contact with and be removed by said wheels, said stationary member providing supports for steadying said jaws, and portions adapted to abut with a stop carried by one of said jaws to cause a separation therebetween at a predetermined point of movement, and means for reciprocating said vise in proximity with said wheels.

15. In a device of the class described, in combination, rotatable abrasive means, and a vise operatively associated therewith and mounted for reciprocation in a direction parallel with the axis of rotation of said abrasive means, said vise being adapted to clamp a blank having angularly disposed faces and automatically position the same whereby, upon the advance of said vise, the blank will be cut away in a direction normal to the front face thereof.

16. In a device of the class described, in combination, rotatable abrasive means, a vise adapted to be moved in a direction parallel to the axis of rotation thereof, said vise comprising self-adjusting jaws whereby irregular blanks will be automatically clamped with a front face substantially perpendicular to the line of advance, and means for effecting a relative movement between said vise and abrasive means.

17. In a device of the class described, in combination, rotatable abrasive means, a vise comprising elongated jaws adapted to automatically clamp a blank with a face perpendicular to one of said jaws, and a means for advancing said vise against said abrasive means in a direction parallel to the axis of rotation thereof whereby said perpendicular face will initially come in contact with said means.

18. In a device of the class described, in combination, an abrasive means, blank-holding means comprising a pair of movable jaws, the one being rigid and having a face normal to the length thereof, the other being swiveled to assume diverse positions, whereby blanks of irregular shapes may be automatically clamped, means for elastically pressing said jaws together during the feed thereof, means for feeding said jaws whereby said blank will be cut along a surface normal to the aforesaid face of the rigid jaw, and a release operative to open said vise during the retreat of said blank-carrying means.

19. In a device of the class described, in combination, an abrasive means, a vise comprising elongated jaws, one of said jaws having a clamping face normal to its length and adapted to be retracted from the other, spring means normally opposing such retraction, said other jaw having a yielding face adapted to conform to an irregular blank whereby the other face of said blank will be substantially parallel to said normal face, means for revolubly advancing said vise and blank toward said abrasive means whereby said blank will be cut away along a surface substantially normal to the aforesaid face of said retractile jaw.

20. In a device of the class described, in combination, a plurality of abrasive wheels, adjustable arms carrying the same, a carriage adapted to reciprocate, a pair of spindles revolubly mounted on said carriage, one of said spindles being fixed against translation with respect to said carriage, said other spindle being capable of translation with respect to said carriage, a spring normally maintaining said spindle in end contact whereby a blank may be clamped therebetween, means for rotating said spindles and simultaneously advancing said carriage along a line parallel to the axes of said wheels whereby said blank will be contacted with said wheels and suitably shaped thereby, and means for preventing lateral movement of said spindles and said wheels with respect to one another.

21. In a device of the class described, in combination, a stationary standard, adjustable arms mounted thereon, abrasive wheels journaled to said arms, a carriage reciprocally mounted on said standard, a pair of spindles revolubly mounted on said carriage, one of said spindles being fixed against translation with respect to said carriage and provided with a swiveled, tripod end, said other spindle being longitudinally slidable with respect to said carriage, a spring normally maintaining said spindle in end abutment with the aforesaid spindle whereby a blank may be clamped therebetween within its periphery, and a means for rotating said spindles and simultaneously advancing said carriage in a line parallel to the axes of said abrasive wheels whereby said blank will be contacted with said wheels and have a circumscribing portion thereof removed, said means being adapted to withdraw said carriage whereby said spring will abut the aforesaid standard to withdraw said retractile spindle and thereby release said blank.

22. In a device of the class described, in combination, a stationary standard, a plurality of similarly disposed, adjustable arms mounted thereon, abrasive wheels journaled to said arms to rotate in a common plane, a carriage reciprocally mounted on said standard to move normal to said plane, a pair of spindles revolubly mounted on said carriage, one of said spindles being fixed against translation with respect to said carriage and having a swiveled, tripod end said other spindle being in end abutment therewith and adapted for being retracted therefrom, an expansible spring normally maintaining said spindle in such abutment, center-rests for preventing vibration of said retractile spindle, and a means for rotating said spindles and simultaneously reciprocating said carriage in a line parallel to the axes of said wheels whereby in the advance thereof a blank clamped between said spindles will be contacted with said wheels and have a circumscribing portion thereof removed, and during the retreat thereof said spring will abut the aforesaid standard to retract a spindle and thereby automatically release said blank.

23. In a device of the class described, in combination, a stationary standard, an adjustable stop thereon, adjustable arms radially positioned on said standard, abrasive wheels journaled to said arms and revoluble in a common plane, a center-rest fixed to said standard, a carriage reciprocally mounted on said standard to move in a direction normal to said plane, a pair of spindles revolubly mounted on said carriage, one of said spindles being fixed against translation therewith and provided with a swiveled tripod end, the other having an abutting end consisting of contact points terminating in a plane substantially parallel to the aforesaid plane and adapted for being longitudinally retracted with respect to said carriage, a spring normally maintaining said spindle in end abutment with the aforesaid spindle whereby a blank having non-parallel faces may be clamped therebetween within its periphery with one face substantially parallel to said planes, said latter spindle being supported by said center-rest, and a means for rotating said spindles and simultaneously reciprocating said carriages whereby during the advance thereof said blank will be contacted with said wheels and be thereby cut away along a surface substantially perpendicular to said face and whereby during the retreat thereof said stop will abut and retract said latter spindle and thereby automatically release said blank.

24. In mechanism of the class described, in combination, means adapted to hold a piece of shell with its edge exposed, a revoluble abrasive member having an abrasive surface inclined with respect to its axis of revolution, and means for moving said holding means in a direction parallel to the axis of revolution of said abrasive member whereby the shell will be carried into contact with the inclined surface thereof.

25. In mechanism of the class described, in combination, means adapted to hold a piece of shell with its edge exposed, a revoluble abrasive member having an abrasive surface inclined with respect to its axis of revolution, and means for causing a relative movement of said holding means and said revoluble member in a direction parallel to the axis of revolution of the latter whereby the abrasive surface of said member will be caused to contact with the edge of the shell.

26. In mechanism of the class described, in combination, means adapted to hold a piece of shell with its edge exposed, a revoluble abrasive member having a portion of its surface inclined with respect to its axis of revolution and another portion of its surface parallel with respect to its axis of revolution, and means for causing the edge of the shell to engage successively said inclined portion and said parallel portion.

In testimony whereof I affix my signature, in the presence of two witnesses.

WILLIAM JOSEPH GOING.

Witnesses:
THOMAS MANSFIELD,
CLARA I. RAWDON.

Copies of this patent may be obtained for five cents each, by addressing the "Commissioner of Patents, Washington, D. C."